United States Patent
Yi et al.

(10) Patent No.: US 8,670,377 B2
(45) Date of Patent: Mar. 11, 2014

(54) HARQ OPERATION METHOD FOR RETRANSMITTED DATA

(75) Inventors: Seung-June Yi, Gyeonggi-Do (KR);
Sung-Jun Park, Gyeonggi-Do (KR);
Young-Dae Lee, Gyeonggi-Do (KR);
Sung-Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 677 days.

(21) Appl. No.: 12/811,613

(22) PCT Filed: Jan. 5, 2009

(86) PCT No.: PCT/KR2009/000029
§ 371 (c)(1),
(2), (4) Date: Aug. 17, 2010

(87) PCT Pub. No.: WO2009/088190
PCT Pub. Date: Jul. 16, 2009

(65) Prior Publication Data
US 2011/0044243 A1 Feb. 24, 2011

Related U.S. Application Data

(60) Provisional application No. 61/018,898, filed on Jan. 4, 2008.

(30) Foreign Application Priority Data

Dec. 31, 2008 (KR) .................. 10-2008-0138703

(51) Int. Cl.
*H04W 4/00* (2009.01)
(52) U.S. Cl.
USPC .......................... 370/328; 370/465

(58) Field of Classification Search
None
See application file for complete search history.

(56) References Cited

U.S. PATENT DOCUMENTS

| 6,388,997 | B1 | 5/2002 | Scott |
| 6,421,334 | B1 | 7/2002 | Baines |
| 6,434,389 | B1 | 8/2002 | Meskanen et al. |
| 7,209,747 | B2 | 4/2007 | Chen |
| 7,310,336 | B2 * | 12/2007 | Malkamaki .................. 370/392 |
| 7,921,348 | B2 * | 4/2011 | Seidel et al. ................. 714/751 |
| 8,131,295 | B2 | 3/2012 | Wang et al. |

(Continued)

FOREIGN PATENT DOCUMENTS

| EP | 2174520 A2 | 4/2010 |
| JP | 2000-151694 | 5/2000 |

(Continued)

OTHER PUBLICATIONS

US Office Action dated Nov. 10, 2011 from corresponding U.S. Appl. No. 12/681,507.

(Continued)

*Primary Examiner* — Rhonda Murphy
(74) *Attorney, Agent, or Firm* — Morgan, Lewis & Bockius LLP (57) ABSTRACT

Disclosed is the radio (wireless) communication system providing a radio communication service and the terminal, and more particularly, to a method of processing retransmitted data effectively so as to minimize a data loss during a HARQ (Hybrid Automatic Repeat reQuest) operation in an Evolved Universal Mobile Telecommunications System (E-UMTS) evolved from the Universal Mobile Telecommunications System (UMTS) or a Long Term Evolution (LTE) system.

7 Claims, 4 Drawing Sheets

(56) References Cited

U.S. PATENT DOCUMENTS

| | | | |
|---|---|---|---|
| 8,320,327 B2 * | 11/2012 | Pani et al. ............... 370/331 |
| 2001/0021661 A1 | 9/2001 | Pautonnier |
| 2001/0024956 A1 | 9/2001 | You et al. |
| 2002/0126629 A1 | 9/2002 | Jiang et al. |
| 2002/0169859 A1 | 11/2002 | Serizawa |
| 2003/0224790 A1 | 12/2003 | Choi |
| 2004/0162074 A1 | 8/2004 | Chen |
| 2004/0208142 A1 | 10/2004 | Saw |
| 2005/0041681 A1 | 2/2005 | Lee et al. |
| 2005/0190712 A1 | 9/2005 | Lee et al. |
| 2005/0220042 A1 | 10/2005 | Chang et al. |
| 2005/0249163 A1 | 11/2005 | Kim et al. |
| 2005/0287957 A1 | 12/2005 | Lee et al. |
| 2006/0035662 A1 | 2/2006 | Jeong et al. |
| 2006/0104225 A1 | 5/2006 | Kim et al. |
| 2006/0116136 A1 | 6/2006 | Noma |
| 2006/0245417 A1 | 11/2006 | Conner et al. |
| 2006/0251023 A1 | 11/2006 | Choi |
| 2006/0251045 A1 | 11/2006 | Okubo |
| 2007/0047547 A1 | 3/2007 | Conner et al. |
| 2007/0049325 A1 | 3/2007 | Lee |
| 2007/0115894 A1 | 5/2007 | Herrmann et al. |
| 2007/0201424 A1 | 8/2007 | Kobayashi et al. |
| 2007/0250751 A1 | 10/2007 | Cai et al. |
| 2007/0253393 A1 | 11/2007 | Tseng |
| 2007/0291688 A1 * | 12/2007 | Jiang et al. ............... 370/328 |
| 2008/0005638 A1 | 1/2008 | Kuo et al. |
| 2008/0043771 A1 | 2/2008 | Cho et al. |
| 2008/0070611 A1 | 3/2008 | Yi et al. |
| 2008/0119209 A1 | 5/2008 | Upp |
| 2008/0188247 A1 | 8/2008 | Worrall |
| 2008/0205433 A1 | 8/2008 | Pihlaja et al. |
| 2008/0220784 A1 | 9/2008 | Somasundaram et al. |
| 2008/0226074 A1 | 9/2008 | Sammour et al. |
| 2008/0232331 A1 | 9/2008 | Ueda |
| 2008/0233941 A1 | 9/2008 | Jen |
| 2008/0268843 A1 | 10/2008 | Ore et al. |
| 2008/0318578 A1 | 12/2008 | Worrall |
| 2009/0034452 A1 | 2/2009 | Somasundaram et al. |
| 2009/0041210 A1 | 2/2009 | Parkvall et al. |
| 2009/0086853 A1 | 4/2009 | Ye |
| 2009/0088160 A1 | 4/2009 | Pani et al. |
| 2009/0111445 A1 | 4/2009 | Ratasuk et al. |
| 2009/0247211 A1 | 10/2009 | Kuroda |
| 2009/0318175 A1 | 12/2009 | Sandberg |
| 2010/0077272 A1 * | 3/2010 | Peisa et al. ............... 714/748 |
| 2010/0091721 A1 | 4/2010 | Larmo et al. |
| 2010/0093386 A1 | 4/2010 | Damnjanovic et al. |
| 2010/0178923 A1 | 7/2010 | Yi et al. |
| 2010/0232301 A1 | 9/2010 | Omori |
| 2010/0284376 A1 | 11/2010 | Park et al. |
| 2010/0290427 A1 | 11/2010 | Sebire et al. |
| 2011/0268234 A1 | 11/2011 | Khandekar et al. |

FOREIGN PATENT DOCUMENTS

| | | |
|---|---|---|
| JP | 2002-268697 | 9/2002 |
| JP | 2003-087317 | 3/2003 |
| JP | 2004-349882 | 12/2004 |
| JP | 2005-530463 | 10/2005 |
| JP | 2006-506892 | 2/2006 |
| KR | 10-2004-0008100 | 1/2004 |
| KR | 10-2004-0008228 | 1/2004 |
| KR | 10-2005-0014984 | 2/2005 |
| KR | 10-2005-0028254 | 3/2005 |
| KR | 10-2006-0024756 | 3/2006 |
| KR | 10-2007-0120453 | 12/2007 |
| WO | WO 03/001681 | 1/2003 |
| WO | 03/027860 | 4/2003 |
| WO | 2004/004163 | 1/2004 |
| WO | WO 2005/091668 | 9/2005 |
| WO | 2005/122441 | 12/2005 |
| WO | 2006/035501 | 4/2006 |
| WO | 2006/096036 A1 | 9/2006 |
| WO | 2006/118426 A1 | 11/2006 |
| WO | 2006/118738 | 11/2006 |

OTHER PUBLICATIONS

US Office Action dated Oct. 12, 2011 from corresponding US Appl. No. 12/677,911.
Office Action issued in corresponding U.S. Appl. No. 12/678,694 dated Jul. 31, 2012.
Office Action dated Oct. 1, 2010 in corresponding U.S. Appl. No. 12/350,030.
Office Action issued in corresponding Japanese Patent Application No. 2010-527898 dated Sep. 28, 2012.
3GPP TSG-RAN WG2 Meeting #59bis, Shanghai, China, Oct. 8-12, 2007.
U.S. Appl. No. 12/345,138 Office Action dated May 4, 2011.
United States Office Action for corresponding U.S. Appl. No. 12/680,422, dated Mar. 29, 2012.
Office Action issued in related technology U.S. Appl. No. 12/811,768 dated Jun. 27, 2012.
3GPP TS 25.402 v.7.5.0, "Technical Specification Group Radio Access Network; Synchronisation in UTRAN Stage 2 (Release 7)," 3rd Generation Partnership Project, Dec. 2007.
R2-074504, "Change Request," 3GPP TSG-RAN2 Meeting #59bis, Oct. 2007.
Japanese Office Action for corresponding Application No. JP2010-527898, dated Feb. 10, 2012.
Office Action issued in related technology U.S. Appl. No. 12/738,278 dated Jul. 12, 2012.
3GPP "CS over HSDPA" TSG-RAN WG2 Meeting #59bis, Shanghai, China, Oct. 8-12, 2007.
Nokia seimens networks "CS over HSPA impact to specification" 3GPP TSG-RAN-WG2 Meeting #59bis, Shanghai, China, Oct. 8-12, 2007.
Office Action issued by the U.S. Patent & Trademark Office on Dec. 21, 2012 in corresponding U.S. Appl. No. 12/677,739.
CS Over HSPA Impact to Specification—Nokia Siemens Networks—3GPP TSG-RAN-WG2 Meeting—Shanghai—Oct. 2007.
Office Action for U.S. Appl. No. 12/738,278—Issued by USPTO on Oct. 24, 2012.
Nokia Corporation et al., "Prioritisation in Utran-LTE Interworking", R2-075063, 3rd Generation Partnership Project (3GPP) TSG-RAN WG2 Meeting #60, Jeju, South Korea, Nov. 2007, XP050603384.
Extended Search Report from counterpart EP Patent Application 08022393.6, dated Aug. 6, 2013.
USPTO: Office Action for U.S. Appl. No. 12/677,739—Issued on Jun. 6, 2013.

* cited by examiner

HARQ OPERATION METHOD FOR RETRANSMITTED DATA

The present application is a national stage of PCT International Application No. PCT/KR2009/000029, filed Jan. 5, 2009, and claims the benefit of U.S. Provisional Application Nos. 61/018,898, filed Jan. 4, 2008. The present national stage application also claims the benefit of Korean Patent Application No. 10-2008-0138703, filed Dec. 31, 2008.

TECHNICAL FIELD

The present invention relates to a radio (wireless) communication system providing a radio communication service and a terminal, and more particularly, to a method of processing retransmitted data effectively so as to minimize a data loss during a HARQ (Hybrid Automatic Repeat reQuest) operation in an Evolved Universal Mobile Telecommunications System (E-UMTS) or a Long Term Evolution (LTE) system.

BACKGROUND ART

Figure 1:
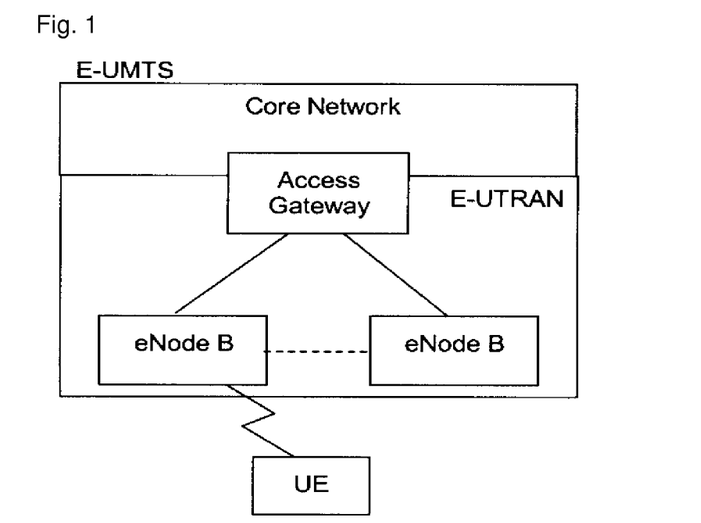
FIG. 1 shows an exemplary network structure of an Evolved Universal Mobile Telecommunications System (E-UMTS) as a mobile communication system to which a related art and the present invention are applied.

FIG. 1 shows an exemplary network structure of an Evolved Universal Mobile Telecommunications System (E-UMTS) as a mobile communication system to which a related art and the present invention are applied. The E-UMTS system is a system that has evolved from the existing UMTS system, and its standardization work is currently being performed by the 3GPP standards organization. The E-UMTS system can also be referred to as a LTE (Long-Term Evolution) system.

The E-UMTS network can roughly be divided into an E-UTRAN and a Core Network (CN). The E-UTRAN generally comprises a terminal (i.e., User Equipment (UE)), a base station (i.e., eNode B), an Access Gateway (AG) that is located at an end of the E-UMTS network and connects with one or more external networks. The AG may be divided into a part for processing user traffic and a part for handling control traffic. Here, an AG for processing new user traffic and an AG for processing control traffic can be communicated with each other by using a new interface. One eNode B may have one or more cells. An interface for transmitting the user traffic or the control traffic may be used among the eNode Bs. The CN may comprise an AG, nodes for user registration of other UEs, and the like. An interface may be used to distinguish the E-UTRAN and the CN from each other.

The various layers of the radio interface protocol between the mobile terminal and the network may be divided into a layer 1 (L1), a layer 2 (L2) and a layer 3 (L3), based upon the lower three layers of the Open System Interconnection (OSI) standard model that is well-known in the field of communications systems. Among these layers, Layer 1 (L1), namely, the physical layer, provides an information transfer service to an upper layer by using a physical channel, while a Radio Resource Control (RRC) layer located in the lowermost portion of the Layer 3 (L3) performs the function of controlling radio resources between the terminal and the network. To do so, the RRC layer exchanges RRC messages between the terminal and the network. The RRC layer may be located by being distributed in network nodes such as the eNode B, the AG, and the like, or may be located only in the eNode B or the AG.

Figure 2:
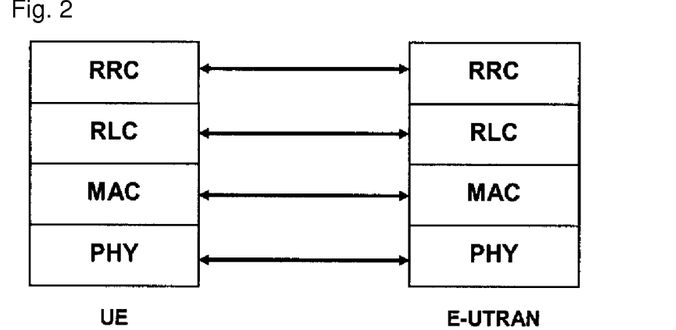
FIG. 2 shows an exemplary view of related art control plane architecture of a radio interface protocol between a terminal and an E-UTRAN.

FIG. 2 shows exemplary control plane architecture of a radio interface protocol between a terminal and a UTRAN (UMTS Terrestrial Radio Access Network) according to the 3GPP radio access network standard. The radio interface protocol as shown in FIG. 2 is horizontally comprised of a physical layer, a data link layer, and a network layer, and vertically comprised of a user plane for transmitting user data and a control plane for transferring control signaling. The protocol layer in FIG. 2 may be divided into L1 (Layer 1), L2 (Layer 2), and L3 (Layer 3) based upon the lower three layers of the Open System Interconnection (OSI) standards model that is widely known in the field of communication systems.

Figure 3:
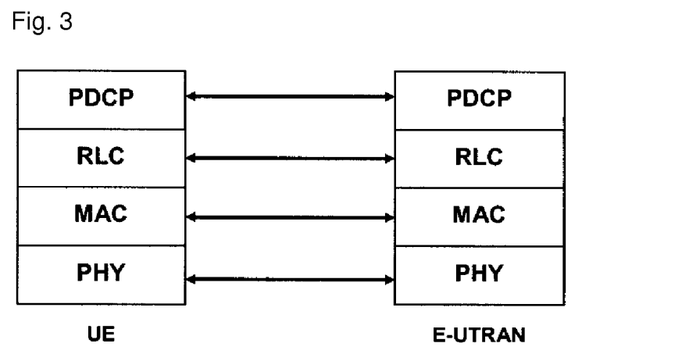
FIG. 3 shows an exemplary view of related art user plane architecture of a radio interface protocol between a terminal and an E-UTRAN.

Hereinafter, particular layers of the radio protocol control plane of FIG. 2 and of the radio protocol user plane of FIG. 3 will be described below.

The physical layer (Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The Medium Access Control (MAC) layer of Layer 2 provides services to a radio link control (RLC) layer (which is a higher layer) via a logical channel. The RLC layer of Layer 2 supports the transmission of data with reliability. It should be noted that if the RLC functions are implemented in and performed by the MAC layer, the RLC layer itself may not need to exist. The PDCP layer of Layer 2 performs a header compression function that reduces unnecessary control information such that data being transmitted by employing Internet Protocol (IP) packets, such as IPv4 or IPv6, can be efficiently sent over a radio interface that has a relatively small bandwidth.

The Radio Resource Control (RRC) layer located at the lowermost portion of Layer 3 is only defined in the control plane, and handles the control of logical channels, transport channels, and physical channels with respect to the configuration, reconfiguration and release of radio bearers (RB). Here, the RB refers to a service that is provided by Layer 2 for data transfer between the mobile terminal and the UTRAN.

Figure 4:
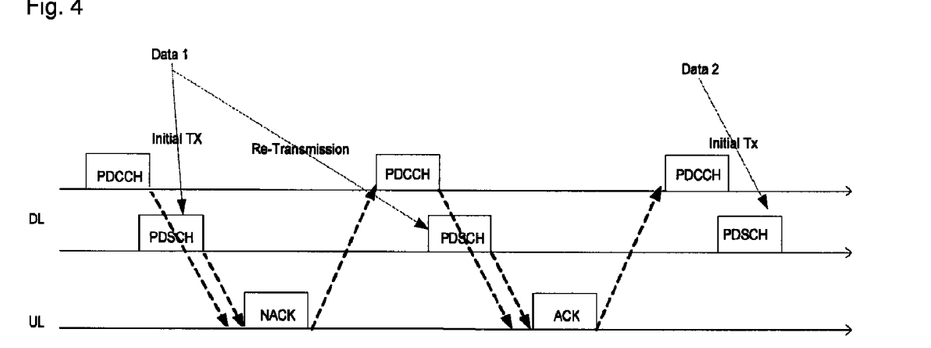
FIG. 4 is an exemplary view showing a detailed embodiment of HARQ applied to a downlink physical layer of a radio packet communication system.

FIG. 4 is an exemplary view showing a detailed embodiment of HARQ applied to a downlink physical layer of a radio packet communication system. As shown in FIG. 4, eNode B decides a UE to receive a packet and a format of packet (coding rate, modulation method, data amount, and the like) to be transmitted to the UE. The eNode B then informs the UE of such information via the PDCCH, and thereafter transmits the corresponding data packet through a Physical Downlink Shared Channel (PDSCH) at an associated time. Thus, the UE can receive the information transmitted via the PDCCH so as to be known of the format of the packet to be transmitted to it and the packet transmission time, and also receive the corresponding packet via the PDSCH. After receiving the packet, the UE decodes the packet data. In case of a successful decoding, the UE transmits an ACK signal to the eNode B. The eNode B receiving the ACK signal may sense that the packet has successfully been received, thus to perform the next packet transmission. In case of an unsuccessful decoding, the UE transmits a NACK signal to the eNode B. The eNode B receiving the NACK signal may sense that the packet has unsuccessfully been received by the UE and accordingly retransmits the same data packet in the same format or a new format at an appropriate time. Here, the UE may combine the retransmitted packet with a packet which was received but failed to be decoded in various ways so as to attempt the decoding again.

In general, during a HARQ operation processing, a data retransmission of a transmitting side is based on feedback information transmitted from a receiving side. Namely, the transmitting side performs data retransmission when a HARQ NACK is received from the receiving side, and the transmitting side prepares to send next (or new) data when a HARQ ACK is received from the receiving side. Here, the transmission of next data is performed when the next data that has to be transmitted is still existed in a buffer of the transmitting side and when a radio resource is allocated for such data transmission.

As explained above, the receiving side has to send a proper feedback to the transmitting side during the HARQ operation. However, in contrast to data transmission of other upper channels, a HARQ ACK/NACK signal contains simple content (i.e., Yes or No), and there is no additional error protection for transmitting the HARQ ACK/NACK signal in current technology. Therefore, transmission errors can be easily happened while the HARQ operation is performed. For example, the receiving side may send an ACK message to the transmitting side, but the transmitting side may receive or treat it as a NACK message, and vice versa. Because of these errors, an optimized HARQ operation can not be performed in current technology.

In case that the receiving side sends a HARQ NACK to the transmitting side, there is a NACK-to-ACK error if the transmitting side receives it as a HARQ ACK. In such situation, the receiving side still waits to receive a retransmission of data, whereas the transmitting side sends a new data instead of retransmitting of the data.

In case that the receiving side sends a HARQ ACK to the transmitting side, there is an ACK-to-NACK error if the transmitting side receives it as a HARQ NACK. In such situation, the transmitting side performs a retransmission of data, and the receiving side receives a duplicated data from the transmitting side, thereby wasting an unnecessary radio resource(s).

Therefore, in a related art, there is no effective HARQ operation method that can minimize data loss due to these kinds of errors.

DISCLOSURE OF INVENTION

Technical Solution

Therefore, an object of the present invention is to minimize data loss that causes by errors during a HARQ operation. In particular, the present invention proposes an optimized HARQ operation for an error caused by a combination of 'PDCCH (Physical Downlink Control Channel) miss detection' and 'DTX-to-ACK error' during a HARQ operation.

To achieve this and other advantages and in accordance with the purpose of the present invention, as embodied and broadly described herein, there is provided a method of processing data for a Hybrid Automatic Repeat Request (HARQ) operation in wireless communication system, the method comprising: receiving a first data transmission indicator and a first data from a network; decoding the first received data; transmitting a positive response message to the network if the first received data is successfully decoded; receiving a second data transmission indicator and a second data from the network after transmitting the positive response message; and decoding the second received data if the first and second data transmission indicators have a same value.

To achieve this and other advantages and in accordance with the purpose of the present invention, as embodied and broadly described herein, there is also provided a method processing data for a Hybrid Automatic Repeat Request (HARQ) operation in wireless communication system, the method comprising: receiving a first data transmission indicator and a first data from a network; decoding the first received data; transmitting a positive response message to the network if the first received data is successfully decoded; receiving a second data transmission indicator and a second data from the network after transmitting the positive response message; and decoding the second received data if the first and second data transmission indicator have a same value and the first and second received data have a different data size to each other, or discarding the second received data if the first and second data transmission indicator have a same value and the first and second received data have a same data size.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

In LTE system, a HARQ operation is performed in a MAC (Medium Access Control) layer for an effective data transmission. The following is a detailed description of the HARQ operation.

Figure 5:
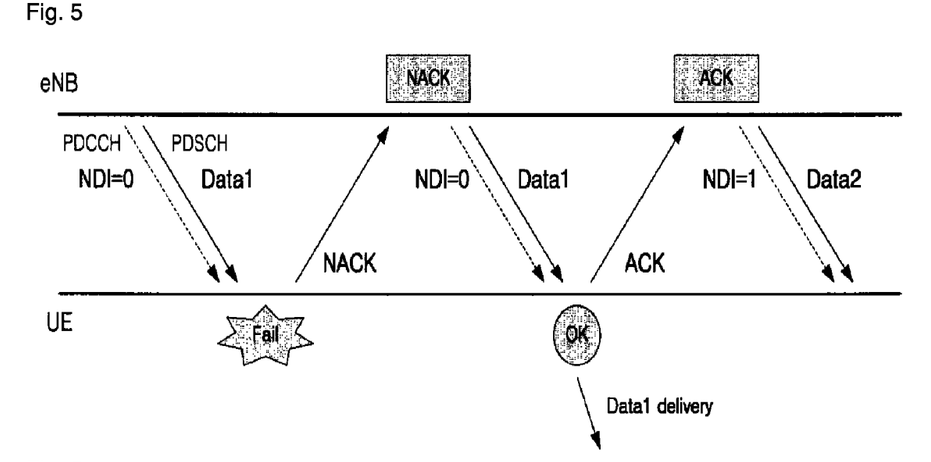
FIG. 5 is an exemplary view showing a HARQ operation method for effective data transmission.

FIG. 5 is an exemplary view showing a HARQ operation method for an effective data transmission. As illustrated in FIG. 5, a base station (or eNB) may transmit downlink scheduling information (referred as 'DL scheduling information' hereafter) through a PDCCH (Physical Downlink Control Channel) in order to provide data to a terminal (UE) during a HARQ operation. The DL scheduling information may include a UE identifier (UE ID), a UE group identifier (Group ID), an allocated radio resource assignment, a duration of the allocated radio resource assignment, a transmission parameter (e.g., Modulation method, payload size, MIMO related information, etc), HARQ process information, a redundancy version, or a new data indicator (NID), etc. The DL scheduling information may be also transmitted at a time of retransmission through the PDCCH, and corresponding information contained in (or related to) the DL scheduling information may change based on a channel condition. For example, if a current channel condition is better than an initial channel condition, the DL scheduling information can be transmitted with a higher bit rate by adjusting a modulation or a payload size. In contrast, if the current channel condition is worse than the initial channel condition, the DL scheduling information can be transmitted with a lower bit rate. The UE (or terminal) may check the DL scheduling information by monitoring the PDCCH in every TTI (Transmission Time Interval), and may receive data from the eNB using PDSCH (Physical Downlink Shared Channel) at a time indicated (or related) to the PDCCH. After the data is received by the UE, the UE may try to decode the received data after storing the data in a soft buffer.

Here, the UE may transmit an ACK signal to the eNB if the received data is successfully decoded, and the UE may transmit a NACK signal to the eNB if the received data is not successfully decoded. Once the eNB receives the ACK signal, the eNB may transmit a next data to the UE with assumption of previous data transmission was successfully transmitted. If the eNB receives the NACK signal, the eNB may transmit same data with an identical transmission format (or a different transmission format) to the UE with assumption of previous data transmission was not successfully transmitted. After transmitting the NACK signal, The UE should wait to receive the retransmitted data. The value in the NDI (New Data Indicator) field contained in the PDCCH may be used for the UE to determine whether the received data is an initial transmission data or a retransmitted data. More specifically, the NDI field is 1 bit field that toggles every time a new data is transmitted or received. (0→1→0→1→ . . . ) As such, the value in the NDI for the retransmitted data always has a same value used in an initial transmission. From this, the UE may know an existence of retransmitted data by comparing these values.

Figure 6:
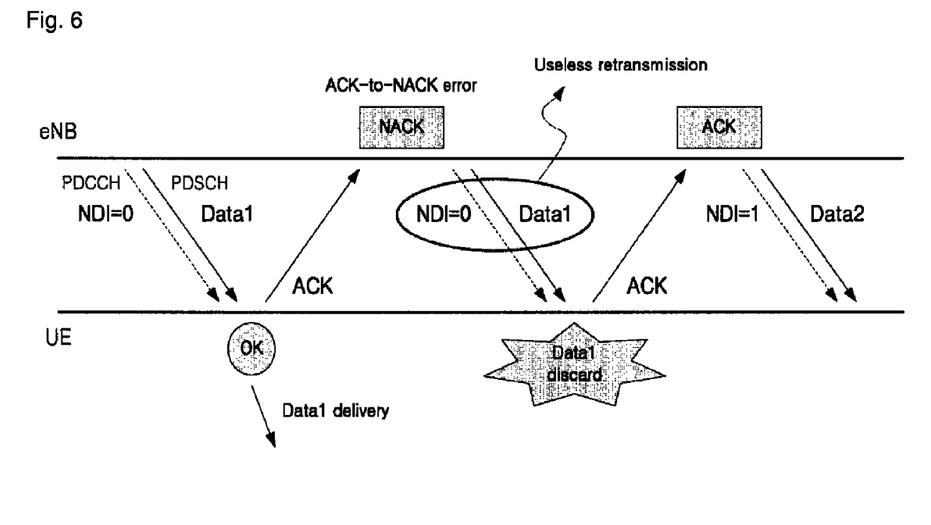
FIG. 6 is an exemplary view showing a HARQ operation method for solving ACK-to-NACK error.

FIG. 6 is an exemplary view showing a HARQ operation method for solving ACK-to-NACK error.

Figure 7:
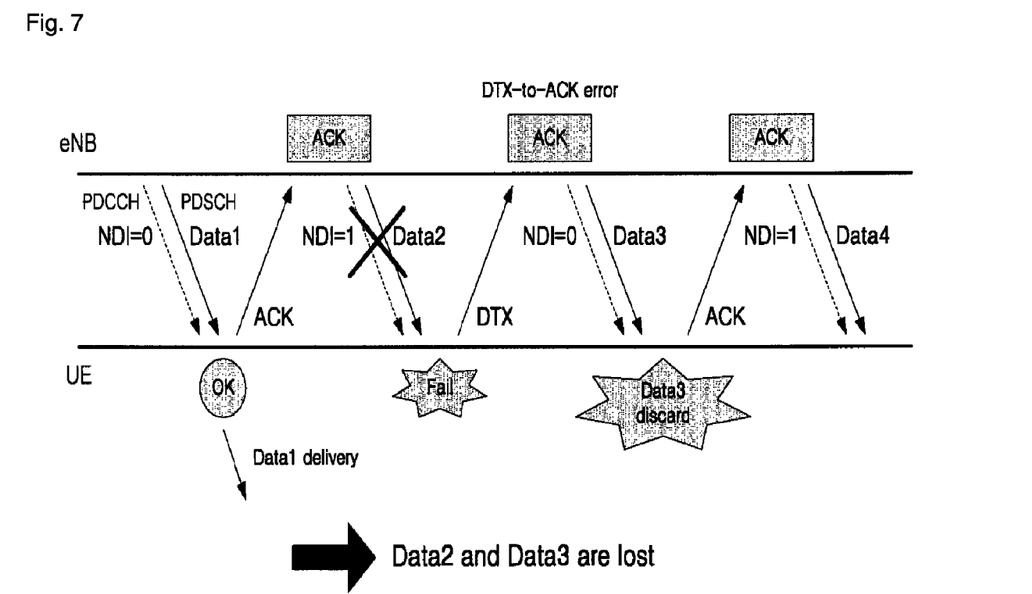
FIG. 7 is an exemplary view showing a HARQ operation method that causes data loss due to a combination of DTX-to-ACK error and a Miss Detection.

As illustrated in FIG. 6, although the UE transmit a HARQ ACK to the eNB, the eNB mistakenly receives or treats it as a HARQ NACK. This is so called an ACK-to-NACK error. In this case, the eNB would retransmit the data in an assumption that the previous data transmission was not successfully transmitted. Although there is no data loss in the ACK-to-NACK error, an unnecessary radio resource is wasted because same or duplicated data, which the UE already has, is transmitted twice. After the duplicated data is received by the UE, The UE may discard this duplicated data, and then may transmit another HARQ ACK for preventing another unnecessary data retransmission. In general, a probability of this ACK-to-NACK error is about $10^{-2}$ FIG. 7 is an exemplary view showing a HARQ operation method that causes data loss due to a combination of 'DTX-to-ACK error' and 'PDCCH miss detection'.

Firstly, the eNB toggles a value in the NDI (NDI=0) and transmit an initial data (D1) to the UE. After that, the UE decodes the received data 1 and may deliver the decoded data 1 to an upper layer of the UE if the data 1 is successfully decoded. Because the data 1 has been successfully received and decoded, the UE transmits a HARQ ACK to the eNB. After the HARQ ACK is received by the eNB, the eNB once again toggles the value in the NDI (NDI=1) and transmit a next data (D2) to the UE. However, the UE may not receive a transmission of PDCCH for transmitting of data 2, and 'the PDCCH miss detection' has been occurred because of this. In general, a probability of the 'PDCCH miss detection' is about $10^{-2}$. If the 'PDCCH miss detection' is occurred, the UE does not receive any data from the eNB and no feedback (ACK or NACK) is transmitted to the eNB. This can be called a DTX (Discontinuous Transmission) of feedback channel. After the data 2 is transmitted to the UE, the eNB may monitor or receive a feedback channel at certain time with expectation of feedback information regarding to the transmitted data 2. Here, although the UE does not transmit any feedback information (DTX), there is possibility that the eNB mistakenly receives or treats the DTX as the HARQ ACK. This can be called as 'DTX-to-ACK error' and a probability of this 'DTX-to-ACK error' is about $10^{-2}$-$10^{-1}$. If the DTX-to-ACK error is occurred, the eNB once again toggles the value in the NDI (NDI=0) and transmits a next data (D3) to the UE with assumption that the data 2 was successfully transmitted. In this case, at the UE side, since the current value of the NDI (NDI=0) is same as previous value of the NDI (NDI=0), the UE may mistreat the currently received data 3 as a retransmitted data 1.

As such, the UE may discard the currently received data 3 (which is treated as data 1 by the UE) and transmits the ACK to the eNB with assumption that there is ACK-to-NACK error at the eNB. After the ACK is received by the eNB, the eNB toggles the value in the NDI (NDI=1) and may transmit a next data (D4) to the UE. As a result, the both data 2 and data 3 are lost due to a combination of the PDCCH miss detection and the DTX-to-ACK error.

Figure 8:
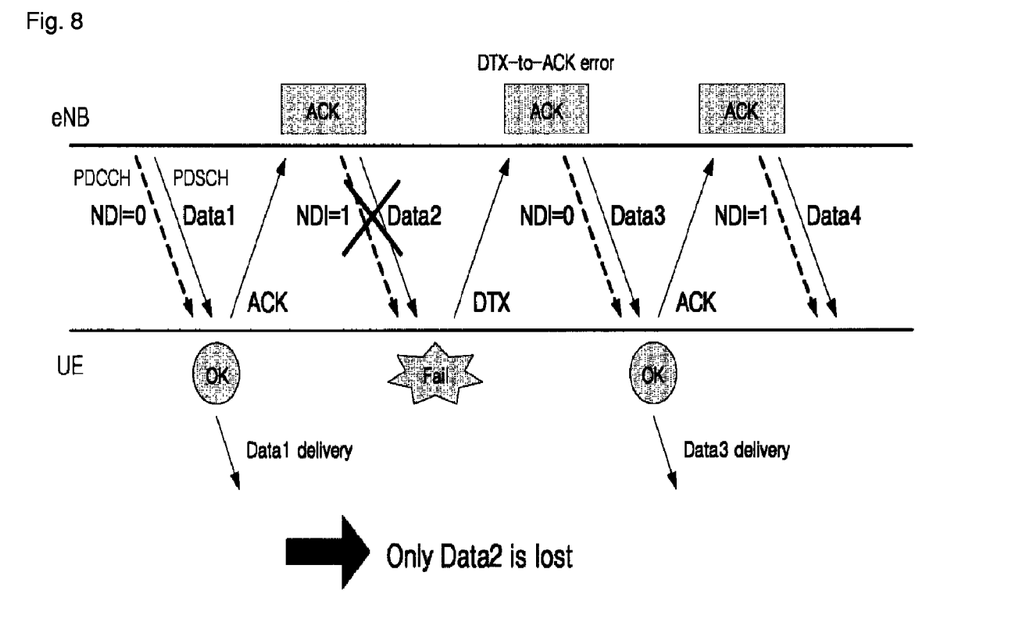
FIG. 8 is an exemplary view showing an improved HARQ operation method according to a first embodiment of the present invention.

FIG. 8 is an exemplary view showing an improved HARQ operation method according to a first embodiment of the present invention.

As illustrated in FIG. 8, the eNB toggles a value in the NDI (NDI=0) and transmits an initial data (D1) to the UE. After that, the UE decodes the received data 1 and may deliver the decoded data 1 to an upper layer of the UE if the received data 1 is successfully decoded. Because the data 1 has been successfully received and decoded, the UE transmits a HARQ ACK to the eNB. After the HARQ ACK is received by the eNB, the eNB once again toggles the value in the NDI (NDI=1) and transmits a next data (D2) to the UE. However, the UE may not receive a transmission of PDCCH for transmitting of data 2, and the 'PDCCH miss detection' has been occurred because of this. If the 'PDCCH miss detection' is occurred, the UE does not receive any data from the eNB and no feedback (ACK or NACK) is transmitted to the eNB. This can be called a DTX (Discontinuous Transmission) of feedback channel. After the data 2 is transmitted to the UE, the eNB may monitor or receive a feedback channel at certain time with expectation of feedback information regarding to the transmitted data 2. Here, although the UE does not transmit any feedback information (DTX), there is possibility that the eNB mistakenly receives or treats the DTX as the HARQ ACK. ('DTX-to-ACK error') If the DTX-to-ACK error is occurred, the eNB once again toggles the value in the NDI (NDI=0) and transmits a next data (D3) to the UE with assumption that the data 2 was successfully transmitted. In this case, at the UE side, since the current value of the NDI (NDI=0) is same as previous value of the NDI (NDI=0), the UE may mistreats the currently received data 3 as a retransmitted data 1.

According to the present invention, the UE always treats the currently received data (actually data 3), which the UE treats it as the retransmitted data 1, as a new data. The currently received data, which is treated as the new data, is then stored in a soft buffer and is decoded. If the currently received data (data 3) is successfully decoded, the UE may deliver the decoded data to an upper layer of the UE and may transmit a HARQ ACK to the eNB. After the ACK is received by the eNB, the eNB toggles the value in the NDI (NDI=1) and may transmit a next data (D4) to the UE. As a result, with the present invention, the only data 2 is lost due to a combination of the 'PDCCH miss detection' and the 'DTX-to-ACK error'.

Namely, the present invention proposes not to discard data, which is suspected to be a retransmission of successfully received data, but to decode such data after storing in the soft buffer.

However, there is a possibility that the retransmitted data may be caused by an actual ACK-to-NACK error at the eNB. If the present invention is applied to this specific case, there is drawback of delivering the duplicated data (retransmitted data) to an upper layer. (e.g., RLC (Radio Link Control) layer) Therefore, a duplicated detection function has to be performed in the upper layer so that the duplicated data can be discarded. Here, the duplicated detection function by the upper layer (RLC layer) can be easily operated using a RLC sequence number (SN).

Figure 9:
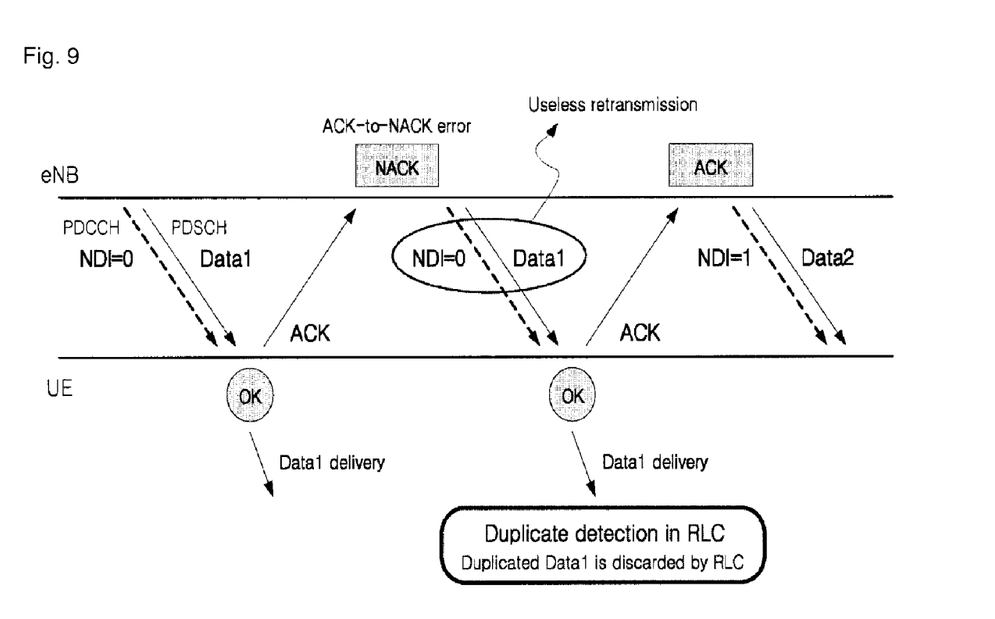
FIG. 9 is an exemplary view showing an improved HARQ operation method according to a second embodiment of the present invention.

FIG. 9 is an exemplary view showing an improved HARQ operation method according to a second embodiment of the present invention.

As illustrated in FIG. 9, the eNB toggles a value in the NDI (NDI=0) and transmits an initial data (D1) to the UE. After that, the UE decodes the received data 1 and may deliver the decoded data 1 to an upper layer of the UE if the data 1 is successfully decoded. Because the data 1 has been successfully received and decoded, the UE transmits a HARQ ACK to the eNB. Here, the ACK-to-NACK error is occurs at the eNB. Therefore, the eNB may retransmit data 1 without toggling the value in the NDI. (NDI=0) At the UE side, since the value of the NDI has not been changed, the UE treats it as the retransmission of data 1. However, as proposed by the present invention, the data 1 is still treated as a new data and the data 1 is decoded after stored in the soft buffer. If the data 1 is successfully decoded, the UE may deliver the decoded data 1 to an upper layer and transmit the ACK to the eNB. In this case, the decoded data 1 is discarded by the duplicated detection function of the RLC layer. In case that the data 1 is not successfully decoded, the data 1 is stored in the soft buffer and the UE transmits the NACK to the eNB.

After the ACK is received by the eNB, the eNB toggles the value in the NDI (NDI=1) and may transmit a next data (D2) to the UE. Here, when the retransmitted data is received by the UE, the UE does not know a specific reason why such retransmission is occurred (i.e., due to an 'ACK-to-NACK error' or a combination of 'PDCCH miss detection' and 'DTX-to-ACK') Also, the probability of having these two errors is almost same.

Therefore, the present invention also proposes to compare a size of previously received data (which successfully decoded) with a size of currently received data. For example, if the size of previously received data is same as the currently received data, the currently received data can be treated as a retransmission of same data. Therefore, the UE may discard this data and may transmit the ACK to the eNB for preventing additional unnecessary retransmission of duplicated data. If the size of previously received data is different than the currently received data, the currently received data may be treated as a new data. Here, the size of the currently received data or previously received data may refer to a size of corresponding MAC PDU (Medium Access Control Protocol Data Unit).

Therefore, an object of the present invention is to minimize data loss that causes by a combination of PDCCH (Physical Downlink Control Channel) miss detection and DTX-to-ACK error during a HARQ operation.

Namely, for HARQ operation for retransmitted data, the problematic case may happen with two reasons; Case1: ACK-to-NACK error in eNB, Case2: (Miss detection of next data in UE) and (DTX-to-ACK error in eNB). In each case, the UE should operate for the retransmitted data, as follows: Case1: Treat it as duplicated data. UE should discard it, and send ACK to eNB to prevent useless retransmission. Case2: Treat it as new data. UE should replace the data in the HARQ buffer with the received data. As explained above, the above two cases have comparable probabilities, so it was thought to be difficult for UE to differentiate between the two cases. In some situation, case 1 may be frequently happened than case 2. Thus, it would be more probable that the retransmission is coming from ACK-to-NACK error, and the desired UE behaviour would be to assume the retransmitted data as duplication and discard the retransmitted data. But if we mandate UE to discard the retransmitted data, there is a possibility that we lose some data. Note that Case2 occurs with $10^{-4} \sim 10^{-3}$ probability, and once it occurs, two subsequent data are lost unless AM RLC is utilized. Therefore, even with lower probability, it might be better to treat the retransmitted data as new data. However, if UE treats the retransmitted data as new data, then useless retransmission might occur until the maximum number of retransmission if the retransmission is coming from ACK-to-NACK error. To cope with both cases, one possible method would be having different UE behaviour depending on the TB size. That is, if the TB size is same as previous one, then UE can assume that it comes from ACK-to-NACK error, and if the TB size is different, then UE can assume that it comes from the combination of miss detection and DTX-to-ACK error. But since this option is a small optimization of a rare case, the need for this option should be justified. In summary, there are three options for HARQ to handle retransmitted data when the data has already been successfully decoded. The followings are these three options: Option1) Discard the received data, Option2) Replace the data in HARQ buffer with the received data, Option3) If TB size is same, go for Option1. Otherwise, go for Option2.

The present invention may provide a method of processing data for a Hybrid Automatic Repeat Request (HARQ) operation in wireless communication system, the method comprising: receiving a first data transmission indicator and a first data from a network; decoding the first received data; transmitting a positive response message to the network if the first received data is successfully decoded; receiving a second data transmission indicator and a second data from the network after transmitting the positive response message; decoding the second received data if the first and second data transmission indicators have a same value; delivering the second data to an upper layer if the second received data is successfully decoded, and transmitting the positive response message to the network; storing the second data into a soft buffer if the second received data is not successfully decoded, and transmitting a negative response message to the network, wherein the first data transmission indicator and/or the second data transmission indicator is received by a New Data Indicator (NDI) field included in a Physical Downlink Control Channel (PDCCH), the NDI field has 1 bit field, the positive response message is an Acknowledgement (ACK) message, and the successfully decoded second data is discarded if it is determined to be duplicated data by a duplicated detection function in the upper layer.

It can be also said that the present invention may provide a method processing data for a Hybrid Automatic Repeat Request (HARQ) operation in wireless communication system, the method comprising: receiving a first data transmission indicator and a first data from a network; decoding the first received data; transmitting a positive response message to the network if the first received data is successfully decoded; receiving a second data transmission indicator and a second data from the network after transmitting the positive response message; and decoding the second received data if the first and second data transmission indicator have a same value and the first and second received data have a different data size to each other, or discarding the second received data if the first and second data transmission indicator have a same value and the first and second received data have a same data size; delivering the second data to an upper layer if the second received data is successfully decoded, and transmitting the positive response message to the network; storing the second data into a soft buffer if the second received data is not successfully decoded, and transmitting a negative response message to the network, wherein the first data transmission indicator and/or the second data transmission indicator is received by a New Data Indicator (NDI) field included in a Physical Downlink Control Channel (PDCCH), the NDI field has 1 bit field, the positive response message is an Acknowledgement (ACK) message, and the successfully decoded second data is discarded if it is determined to be duplicated data by a duplicated detection function in the upper layer.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method processing data for a Hybrid Automatic Repeat Request (HARQ) operation in a wireless communication system, the method comprising:
receiving a first data transmission indicator and a first data from a network;
decoding the first received data;
transmitting a positive response message to the network if the first received data is successfully decoded;
receiving a second data transmission indicator and a second data from the network after transmitting the positive response message; and
decoding the second received data if the first and second data transmission indicator have a same value and the first and second received data have a different data size to each other, or discarding the second received data if the first and second data transmission indicator have a same value and the first and second received data have a same data size.

2. The method of claim 1, wherein the first data transmission indicator and/or the second data transmission indicator is received by a New Data Indicator (NDI) field included in a Physical Downlink Control Channel (PDCCH).

3. The method of claim 2, wherein the NDI field has 1 bit field.

4. The method of claim 1, wherein the positive response message is an Acknowledgement (ACK) message.

5. The method of claim 1, further comprising:
delivering the second data to an upper layer if the second received data is successfully decoded, and transmitting the positive response message to the network.

6. The method of claim 5, wherein the successfully decoded second data is discarded if it is determined to be duplicated data by a duplicated detection function in the upper layer.

7. The method of claim 1, further comprising: storing the second data into a soft buffer if the second received data is not successfully decoded, and transmitting a negative response message to the network.

* * * * *